Jan. 19, 1971  J. H. LONG ET AL  3,555,716
FISHING POLE HOLDER
Filed Sept. 26, 1968

JOSIAH H. LONG
WILBERT W. LONG
HENRY H. LONG
INVENTOR.

BY

United States Patent Office 3,555,716
Patented Jan. 19, 1971

3,555,716
FISHING POLE HOLDER
Josiah H. Long, Wilbert W. Long, and Henry H. Long, Spokane, Wash. (all of 5019 Harvard Road, Otis Orchards, Wash. 99027)
Filed Sept. 26, 1968, Ser. No. 762,710
Int. Cl. A01k 97/10, 97/12
U.S. Cl. 43—17
9 Claims

ABSTRACT OF THE DISCLOSURE

A fishing pole holder having a frame adapted to be fixed in a level position and having a pole holder hinged thereon for relative movement and held in equilibrium between its movement limits by an adjustable tensioning means, there being a movement sensing indicator adapted to be actuated when the pole holder moves from its position of equilibrium.

---

Our present invention relates to fishing equipment and more particularly to a fishing pole holder which is adapted to be supported by a fixed support, i.e., the earth or a man-made fixed contrivance such as a dock, as opposed to a moving support as a boat, barge or other floating vehicle.

It has for its principle object the provision of a fishing pole holder which will produce a manually discernable indication when the forces normally in equilibrium are disturbed by a fish taking the bait.

Another object of the present invention lies in the provision of a fishing pole holder adapted to yieldably support a fishing pole in equilibrium intermediate its limits of movement so that changes in the forces acting thereupon will activate a manually discernible indicator.

Yet another object of this invention is to provide the aforesaid fishing pole holder with adjustable means for effecting said equilibrium even though poles of fishing lines and equipment of varying weights and/or lengths are substituted.

A still further object of the present invention lies in the provision of a fishing pole holder of the character described, which is admirably adapted for being transported from place to place by a fisherman by reason of its construction and arrangement of parts which are susceptible of selective disconnection and storage within a hollow frame forming a part of said holder.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention which is to be understood only in accordance with the appended claims. Furthermore, it is to be understood that while the invention is described in one particular association, it is not our intention to unnecessarily limit the applicability of the invention, but we desire to reserve to ourselves the claimed invention for every use of which it is now known or subsequently discovered to be susceptible.

Other advantages and features of this invention will become apparent from the more detailed description following in which like reference numerals are employed to designate similar parts in the accompanying drawings, wherein.

Figure 1:
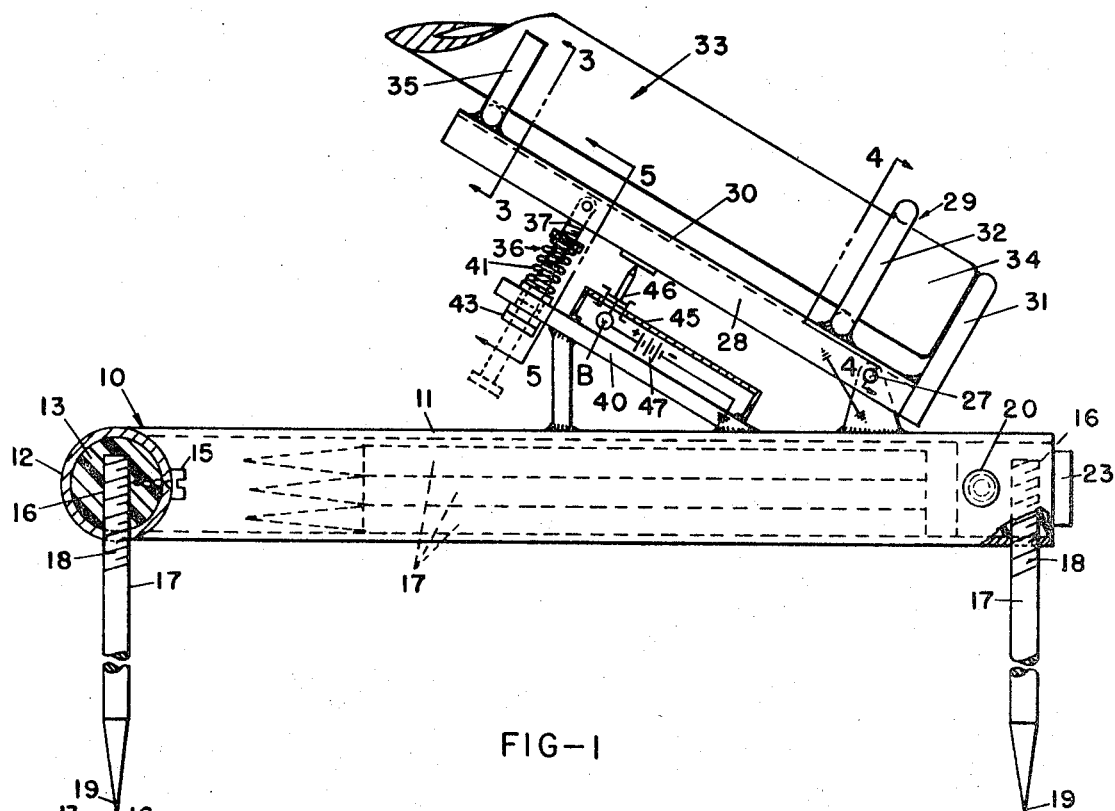
FIG. 1 is a side levational view of our device, and has parts broken away for convenience of illustration.
Figure 2:
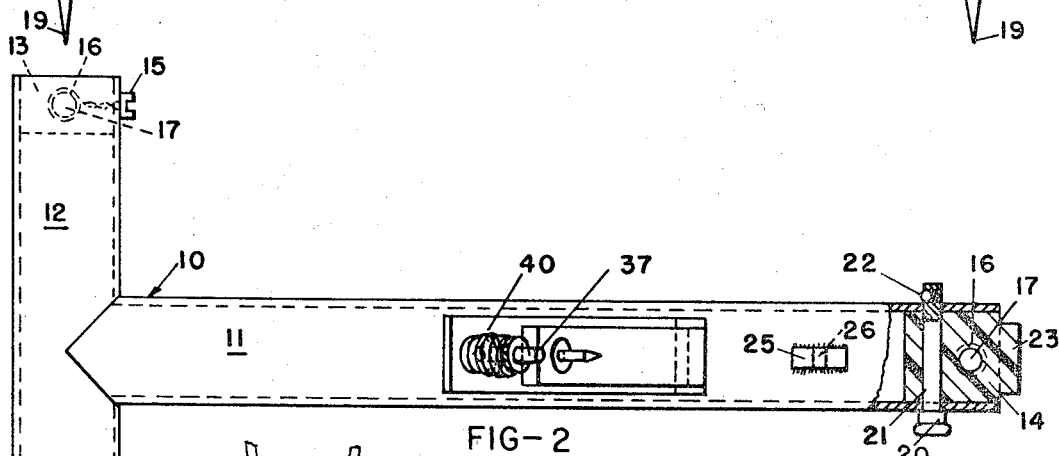
FIG. 2 is a top plan view having the pole holder and other fragmentary portions removed.
Figure 5:
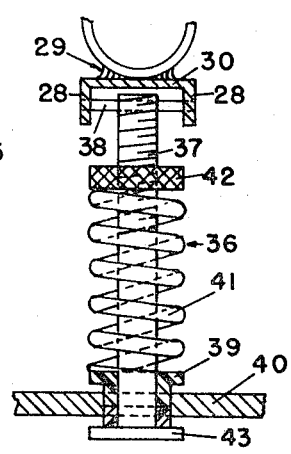
FIG. 5 is an enlarged view partially in section of tension varying means for supporting the pole holder indicated by line 5—5 of FIG. 1.
Figure 3:
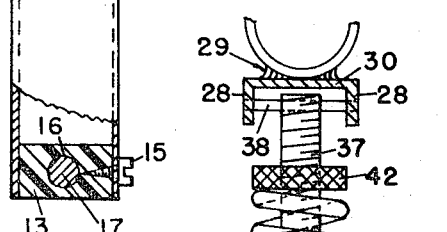
FIG. 3 is a fragmentary section of the saddle portion of the pole holder substantially at the plane indicated by line 3—3 of FIG. 1.
Figure 4:
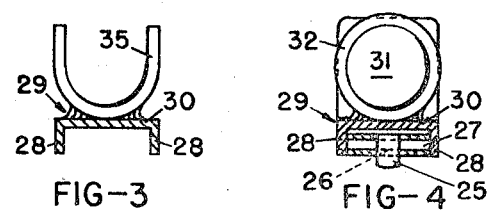
FIG. 4 is a fragmentary section of the pivotal connector between the frame and pole holder on the planes indicated by lines 4—4 of FIG. 1.

The drawing, in greater detail, shows a T-shape frame 10 formed of hollow tubular metallic material, for example, aluminum, and comprises an elongate standard 11, welded or otherwise secured midway the length of a cross head 12. The open free ends of the cross head 12 and standard 11 are closed by plugs 13 and 14.

Plugs 13 fit snugly into the internal diameter of the cross head 12 and are removably secured therein by screws 15—15 which pass through the wall of the cross head and are engaged in their respective plug 13. With the plugs 13 and 14 located in the open ends of the tubular frame members 11 and 12, holes 16 are drilled and tapped through their walls into the respective plug 13 or 14 from the bottom side upwardly. Support rods 17 having male threads 18 thereon are threaded into the tapped holes 16, are removably threaded therein and serve to support the frame 10. The bottom ends of the rods 17 are conically sharpened at 19 to admit of manual force to cause the rods 17 to penetrate the earth and thereby level the frame's cross head 12 and standard 11. Where the frame will be supported upon a nearly level wooden or concrete dock or the like, the mating threads 16 and 18 are of sufficient extent to allow for precise levelling by manually adjusting the amount of penetration of each rod 17 into its tapped hole 16.

Instead of a screw 15, the plug is provided with a manually removable anchoring pin 20, disposed in relationship to lock the plug 14 by extending through an aligned bore 21 through the opposed walls of the standard 11 and the plug 14, and releasably held therein by a biased detent 22. Plug 14 has a hand engageable boss 23 to facilitate removal and replacing the plug in the open end of the standard 11 which is of a length and internal diameter sufficient to accommodate the three rods 17 when stored.

On its top and adjacent to the end closed by plug 14, the standard has a boss 25 drilled at 26 axially parallel to the head 12. A pin 27 extends through the bore 26 and has its ends fixed in the flanges 28—28 of the inverted U-shaped bar 30 of pole holder 29, thus supported for tilting movements in a vertical plane about the axis of pin 27. The bar 30 is thereby adapted to extend forwardly, toward the head 12, at an upward incline.

Adjacent to its lower rearward end, the bar 30 is provided with an abutment 31 and a ring 32 spaced forwardly therefrom a slight distance. These elements 31 and 32 constitute a socket adapted to receive the butt end portion 34 of a fishing pole 33. Spaced upwardly and forwardly along the bar 30 is a U-shape saddle 35 which receives and holds the pole 33 spaced from the butt end portion 34 against lateral and downward movements.

It is thus understood that we have provided a fishing pole holder 29 adapted to removably hold a fishing pole and facilitate vertical movements of a pole holder on its frame.

Means 36 is provided for yieldably supporting the pole holder 29 intermediate its limits of tilting movements. Said means 36 comprises a guide rod 37 pivotally connected at its upper end by means of a pin 38 fixed in the flanges 28 and extending through a dielectric bushing 39 carried by a sub frame 40. A variable tension spring 41 encircles the rod 37 and is adjustably confined between the dielectric bushing 39 and a thumb nut 42 threadedly carried by the rod 37. It will thus be seen that the pole holder 29 and pole 33 may be supported in equilibrium upon the spring 41 so that any increase or decrease in vertical force upon the pole holder 29 by movement of the fishing line (not shown) will impart a corresponding pivotal movement to the pole holder 29. If desired, the tension of spring 41 may be increased to bring the head 43 of the rod 37 into contact with the busing 39 so that only downward force will move the pole holder 29.

An indicator 45, here shown as a battery operated buzzer, may be any one of a number of manually discernible indicators, i.e., auditory, visual, touch, etc., is carried by the fishing pole holder and is adapted to be activated by movements of the pole holder 29 away from equilibrium.

In the species shown, a double acting normally open switch 46 is connected in series with a buzzer B and a battery 47 by adequate circuitry so that tilting movements of the pole holder 29 will close switch 46 and activate the buzzer B.

Having thus described our invention, we desire to secure by the Letters Patent of the United States the following specifically recited invention and we herefore claim:

1. A fishing pole holder, comprising:
   a tubular frame having support means for substantially leveling said frame;
   said support means being adapted to be enclosed within said tubular frame when stored;
   a pole holder supported for limited movement relative to said frame;
   tensioning means yieldably holding said pole holder spaced from its movement limit;
   an indicator having a manually discernible potential; and
   means sensitive to movement of said pole holder effective to actuate said indicator.

2. A fishing pole holder, comprising:
   a tubular frame having support means for substantially levelling said frame;
   said support means being adapted to be enclosed within said tubular frame when stored;
   a pole holder supported for limited movement relative to said frame;
   tensioning means yieldably holding said pole holder in stable equilibrium intermediate its movement limits;
   an indicator having a manually discernible potential; and
   means sensitive to movement of said pole holder from equilibrium, effective to actuate said indicator.

3. The invention according to claim 2 wherein said pole holder is pivotally carried by said frame for movements toward and away from said frame; and
   said tensioning means comprises a manually adjustable resilient means between said frame and said pole holder for adjusting the tension to support said pole holder for movement when the forces vary from equilibrium.

4. The invention according to claim 3 wherein said indicator comprises:
   an electrical circuit including,
      a battery,
      a battery operated sounding device, and
      a normally open circuit completing switch;
   said switch being adapted to be activated by movement from equilibrium of said pole holder relative to said frame.

5. The invention according to claim 2 wherein said pole holder comprises:
   a socket adapted to receive the butt of a fishing pole; and
   a spaced U-shape saddle fixed with respect to said socket and at a higher elevation, whereby a fishing pole having its butt end in said socket and lying in said saddle will be disposed at an upward incline from butt to tip.

6. The invention according to claim 2 wherein:
   said pole holder is hingedly interconnected at its rearward end to said frame for tilting movements in a vertical plane, and extends forwardly therefrom at an upward incline;
   electrical circuitry, comprising:
      a battery,
      a battery operated sounding device, and
      a circuit completing normally open switch;
   means yieldably supporting said pole holder above its lower limit of tilting movement; and
   means actuated by downward tilting movement of said holder for closing said normally open switch.

7. The invention according to claim 2 and further characterized by said means yieldably supporting said pole holder, comprising:
   a guide rod pivotally secured to said pole holder spaced from its hinging connection with said frame;
   a journal fixed with respect to said frame and reciprocally guiding movements of said guide rod; and
   a spring having manually adjustable means for varying the tension thereof disposed to yieldably urge said pole holder against downward tilting movements.

8. The invention according to claim 7 wherein said pole holder comprises:
   a socket adapted to receive the butt of a fishing pole; and
   a spaced U-shaped saddle fixed with respect to said socket and at a higher elevation, whereby a fishing pole having its butt end in said socket and lying in said saddle will be disposed at an upward incline from butt to tip.

9. The invention according to claim 2 and further characterized by:
   said frame being tubular and T-shape in plan and having cross-head and a standard interconnected midway the ends of said cross-head;
   said means for substantially levelling said frame comprising rigid rods pointed at one end and externally threaded at the other and of a length adapted to be contained within said tubular frame;
   the free ends of said tubular frame being closed with solid plugs therein;
   said free ends containing said plugs having radially disposed openings interiorly threaded; and
   said rods each extending into one said opening and being threadedly engaged, whereby said plugs are removably secured to close the free ends of said frame and said rods may be axially adjusted according to manual selection by varying the amount of threading movements.

References Cited

UNITED STATES PATENTS

| | | | |
|---|---|---|---|
| 2,811,801 | 11/1957 | Daniel | 43—15 |
| 1,144,726 | 6/1915 | Robinson et al. | 248—165X |
| 2,745,088 | 5/1956 | Bauer | 43—17X |
| 2,817,176 | 12/1957 | Harshbarger | 43—17 |
| 2,917,858 | 12/1959 | Ikeuchi | 43—17 |
| 3,186,666 | 6/1965 | Williams | 248—44 |

SAMUEL KOREN, Primary Examiner

D. J. LEACH, Assistant Examiner

U.S. Cl. X.R.

43—21.2; 248—48